(12) United States Patent
Hoshihara et al.

(10) Patent No.: US 8,228,895 B2
(45) Date of Patent: Jul. 24, 2012

(54) RADIO COMMUNICATION DEVICE AND RADIO COMMUNICATION SYSTEM

(75) Inventors: Yasunori Hoshihara, Tokyo (JP); Kinichiro Nishiyama, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 13/128,712

(22) PCT Filed: Nov. 10, 2009

(86) PCT No.: PCT/JP2009/005985
§ 371 (c)(1),
(2), (4) Date: May 11, 2011

(87) PCT Pub. No.: WO2010/089823
PCT Pub. Date: Aug. 12, 2010

(65) Prior Publication Data
US 2011/0216758 A1   Sep. 8, 2011

(30) Foreign Application Priority Data
Feb. 6, 2009 (JP) .................................. 2009-025784

(51) Int. Cl.
*H04J 3/06* (2006.01)
*H04B 7/216* (2006.01)
*H04W 72/00* (2009.01)
(52) U.S. Cl. ...... 370/350; 370/342; 455/450; 455/452.1
(58) Field of Classification Search .................. 370/350
See application file for complete search history.

(56) References Cited

U.S. PATENT DOCUMENTS

| | | | |
|---|---|---|---|
| 6,219,347 B1 * | 4/2001 | Uchida et al. ................. | 370/347 |
| 6,330,603 B1 * | 12/2001 | Seki et al. ..................... | 709/226 |
| 6,704,280 B1 * | 3/2004 | Mangin et al. ................ | 370/230 |
| 6,898,641 B1 * | 5/2005 | Kobayashi ..................... | 709/238 |
| 2002/0159432 A1 * | 10/2002 | Sugaya .......................... | 370/349 |
| 2004/0193971 A1 * | 9/2004 | Soong et al. .................. | 714/704 |
| 2005/0027890 A1 | 2/2005 | Nelson et al. | |
| 2005/0286422 A1 | 12/2005 | Funato | |
| 2007/0274206 A1 * | 11/2007 | Habetha et al. ............... | 370/222 |
| 2010/0316043 A1 | 12/2010 | Doi et al. | |

FOREIGN PATENT DOCUMENTS

| | | |
|---|---|---|
| JP | 2002-185550 A | 6/2002 |
| JP | 2008/199431 A | 8/2008 |
| JP | 2008-219872 A | 9/2008 |
| WO | WO 2004/019521 A1 | 3/2004 |

* cited by examiner

*Primary Examiner* — Jeffrey Pwu
*Assistant Examiner* — Noel Beharry
(74) *Attorney, Agent, or Firm* — Birch, Stewart, Kolasch & Birch, LLP (57) ABSTRACT

A radio communication device is provided, including a radio control unit for achieving timing synchronization using frames having a fixed period, assigning a transmission and reception interval during which a report signal for informing state management information about each communication device and a control signal for controlling each radio communication device are transmitted and received to a fixed time interval at the head of each frame, for transmitting and receiving application data to and from a partner radio communication device during another time interval, and for reserving and securing some of communication band units, each of which has a fixed width and into which each frame is divided according to a difference between the transmission rate of the application data and that of a signal in a wireless section, on a unit-by-unit basis by using the report signal and the control signal.

17 Claims, 10 Drawing Sheets

| Transmission Rate | RSSI [dBm] | Secured Communication Band for Retransmission (Number of Retransmitted Packets) | | |
|---|---|---|---|---|
| | | Data Length (Less Than 500 Bytes) | Data Length (500 to 2,000 Bytes) | Data Length (More Than 2,000 Bytes) |
| XX[Mbps] | -20 | 1 | 2 | 2 |
| | -25 | 1 | 2 | 2 |
| | -30 | 1 | 2 | 2 |
| | ... | ... | ... | ... |
| | -50 | 2 | 4 | 6 |
| | -55 | 2 | 4 | 6 |
| | -60 | 2 | 4 | 6 |
| | -70 | 4 | 6 | 8 |

(b)

| Transmission Rate | SNR [dB] | Secured Communication Band for Retransmission (Number of Retransmitted Packets) | | |
|---|---|---|---|---|
| | | Data Length (Less Than 500 Bytes) | Data Length (500 to 2,000 Bytes) | Data Length (More Than 2,000 Bytes) |
| XX[Mbps] | 30 | 1 | 2 | 2 |
| | 28 | 1 | 2 | 2 |
| | 26 | 1 | 2 | 2 |
| | ... | ... | ... | ... |
| | 10 | 2 | 4 | 6 |
| | 8 | 2 | 4 | 6 |
| | 6 | 4 | 6 | 8 |

RADIO COMMUNICATION DEVICE AND RADIO COMMUNICATION SYSTEM

FIELD OF THE INVENTION

The present invention relates to a radio communication device and a radio communication system suitable for use in communications of application data which require a real-time nature, such as video transmission.

BACKGROUND OF THE INVENTION

Recent years have seen a speedup and a dramatic increase in channel capacity in radio communications, and applications applied to radio communication technologies have been also diversifying. Particularly, radio video transmission which was difficult to be implemented because radio channel capacity was insufficient has been spread in the form of video streaming services provided for mobile terminals, and in the form of transmission between a large screen flat TV and a tuner.

However, there are still many technological problems in using radio communications. Compared with cable communications, radio communications have bad transmission quality, and therefore various technical improvements have been made in order to compensate for the bad transmission quality. For example, a technology of adding an error correcting code to improve the resistance to errors, and a technology of carrying out retransmission control at the time of occurrence of errors are known. While these technologies can reduce the occurrence of transmission errors, a problem with the technologies is that from the viewpoint of the whole communication system, the addition of error correcting codes causes a reduction in the transmission throughput resulting from an increase in the overhead and the retransmission control causes an increase in the transmission delay resulting from the buffering control.

In order to solve the above-mentioned problem, for example, a radio communication device which, in order to guarantee the real-time nature of data, such as a video image, in radio packet communications (i.e., to reduce a transmission delay), transfers a packet required for image reproduction to a higher-level application without discarding the packet even if the packet has an error to suppress the disorder of the video image by using the error compensation of a decoder for image reproduction is known conventionally (for example, refer to patent reference 1).

Furthermore, a communication device which carries out retransmission control, which is based on a packet transmission error in a communication network, in advance regardless of the presence or absence of a transmission error in order to reduce a transmission delay which occurs due to the retransmission control is also known (for example, refer to patent reference 2).

RELATED ART DOCUMENT

Patent Reference

Patent reference 1: JP,2002-185550,A
Patent reference 2: JP,2008-199431,A

SUMMARY OF THE INVENTION

According to any of the technologies disclosed by above-mentioned patent reference 1 and patent reference 2, communications can be carried out with the transmission delay being reduced. However, because the technology disclosed by patent reference 1 tolerates the occurrence of transmission errors in the wireless section in order to reduce the transmission delay and provides the process of transferring data to the higher-level application just as they are, the transmission quality in the wireless section degrades. Furthermore, because the technology disclosed by patent reference 2 provides the process of carrying out the retransmission control in advance regardless of the presence or absence of a transmission error in order to reduce the transmission delay, a problem is that the transmission throughput decreases because a communication band wider than necessary is used.

Furthermore, the difference between the transmission rate of application data and that of the wireless section is also concerned with the transmission delay. More concretely, a problem regarding this transmission delay will be explained briefly with reference to FIGS. 9(a) and 9(b).

Figure 9:
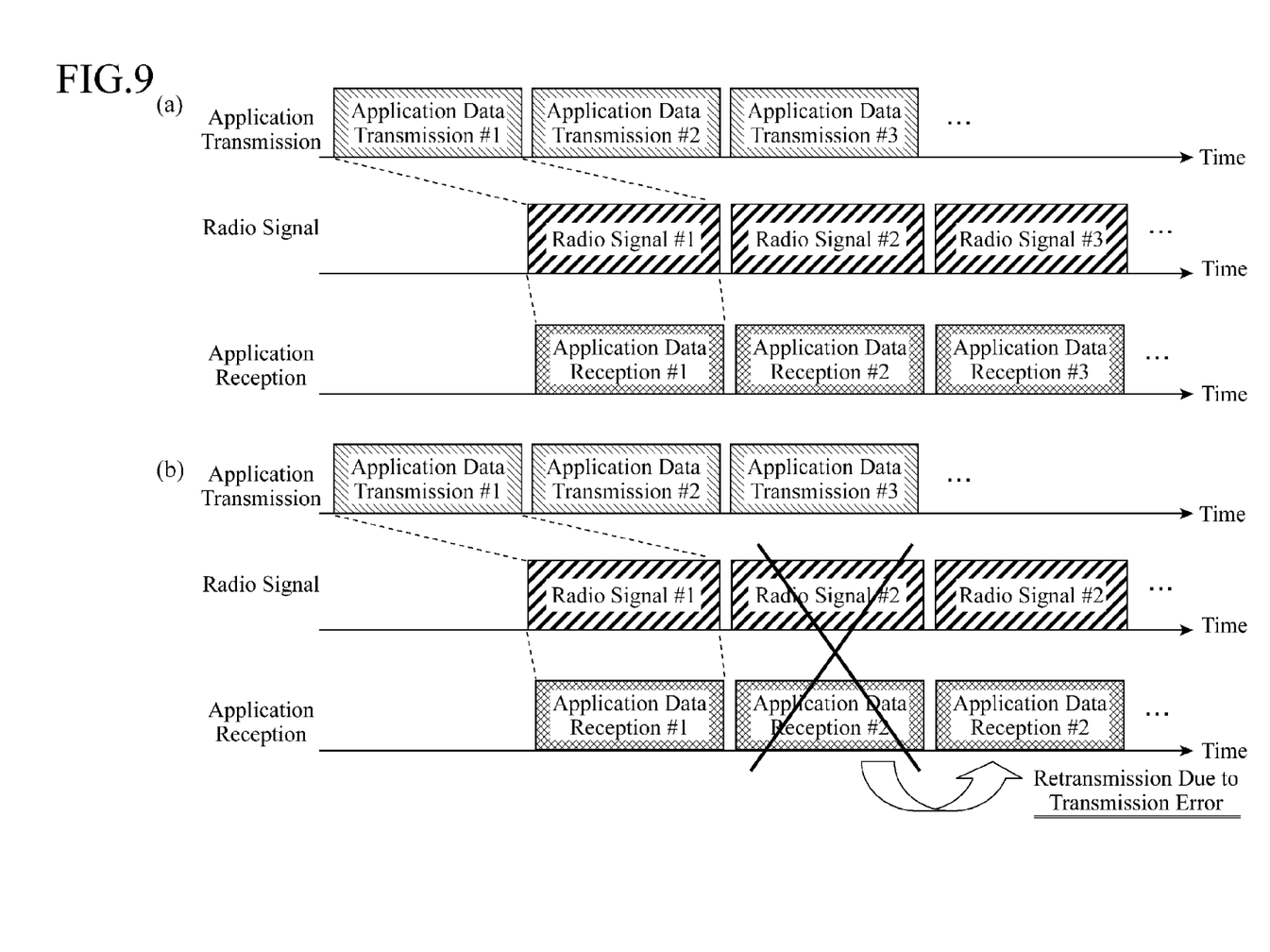
FIG. 9 is a view showing an example of a secured communication band in a conventional example in which the transmission rate of application data is the same as that of a wireless section.

FIGS. 9(a) and 9(b) are both timing charts each showing an application transmission operation in a transmit side radio communication device when the transmission rate of the wireless section is the same as that of application data, a radio signal transmission operation in the wireless section, and an application reception operation in a receive side radio communication device on the time axis.

As shown in FIG. 9(a), packet transmission of transmission application data is carried out by the transmit side radio communication device, and transmitted packets are received by the receive side radio communication device, and they are transferred to an upper layer as received application data. In this case, no transmission delay other than processing delays occurring in the transmission and reception side radio communication devices occurs, and therefore the total transmission delay is relatively small.

However, as shown in FIG. 9(b), when a transmission error (denoted by x in the figure) occurs in the wireless section (the radio signal), the erroneous packet is usually destroyed by the receive side radio communication device (application reception), and the same packet data is retransmitted from the transmit side radio communication device to the receive side radio communication device. In this case, because a temporary blackout of the reception of the application data occurs in the receive side radio communication device during the retransmission control, an error occurs in the higher-level application.

To solve this problem, a method of disposing a buffer in the receive side radio communication device to prevent the occurrence of the temporary blackout of the reception of the application data even if the retransmission control occurs, and transferring the received application data to the higher-level application after storing the received application data in the buffer in advance can be considered. However, in this case, the transmission delay increases due to the volume of the data stored in the buffer.

Figure 10:
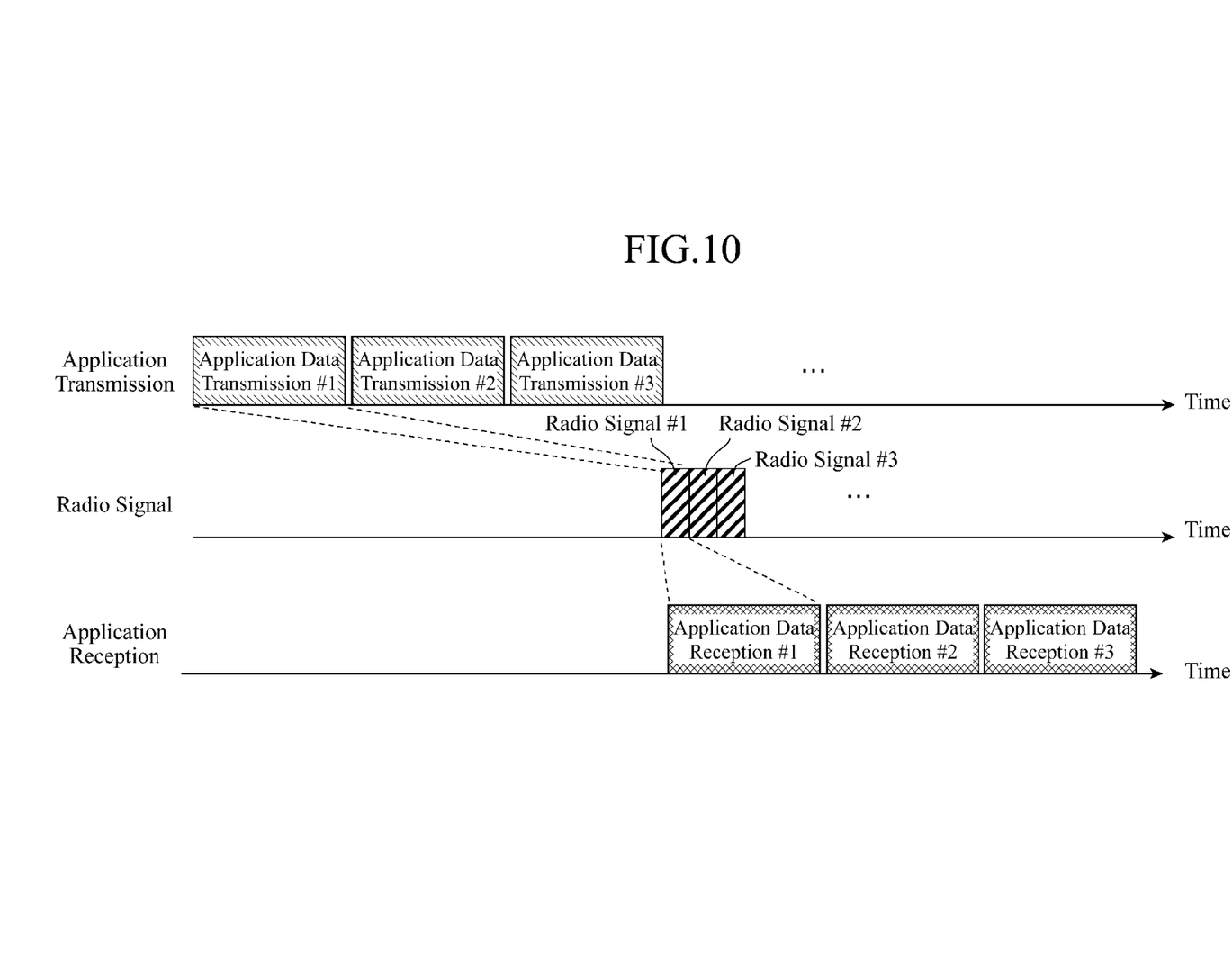
FIG. 10 is a view showing an example of a secured communication band in a conventional example in which the transmission rate of the wireless section is higher than that of the application data.

FIG. 10 is a timing chart showing a transmission operation of the transmit side radio communication device (application transmission), a transmission operation of transmitting the radio signal in the wireless section, and a reception operation of the receive side radio communication device (application reception) on the time axis in a case in which the transmission rate of the wireless section is higher than that of the application data.

As shown in FIG. 10, when packet data are unified and transmitted by the transmit side radio communication device in order to improve the transmission throughput of the wireless section, the transmit side radio communication device requires a buffer for unifying the transmit side packet data, and therefore the transmission delay may increase according to the amount of transmission application data stored in the buffer.

Although the transmit side radio communication device needs to carry out packet transmission for each transmission application data in order to reduce this transmission delay, as shown in above-mentioned FIG. 9(a), also in this case, a temporary blackout of the reception of the application data occurs in the receive side radio communication device when a transmission error occurs in the wireless section, like in the example shown in FIG. 9(b). Therefore, in order to prevent the occurrence of errors in the higher-level application, the receive side radio communication device needs to have a buffer and this results in an increase in the transmission delay.

Thus, measures for preventing the occurrence of errors when carrying out radio communications of application data to reduce the transmission delay and improve the transmission performance are an important design matter.

The present invention is made in order to solve the above-mentioned problems, and it is therefore an object of the present invention to provide a radio communication device and a radio communication system which prevent the occurrence of errors when carrying out radio communications of application data which require a real-time nature, such as a video image, to reduce the transmission delay, thereby improving the transmission performance.

A radio communication device in accordance with the present invention includes: a radio control unit for achieving timing synchronization using frames having a fixed period, assigning a transmission and reception interval during which a report signal for informing state management information about each of radio communication devices and a control signal for controlling each of the above-mentioned radio communication devices are transmitted and received to a fixed time interval at a head of a frame, for transmitting and receiving application data to and from a partner radio communication device during another time interval, and for reserving and securing one or more of communication band units, each of which has a fixed width and into which each frame is divided according to a difference between a transmission rate of the above-mentioned application data and that of a signal in a wireless section, on a unit-by-unit basis by using the above-mentioned report signal and the above-mentioned control signal.

Furthermore, a radio communications system in accordance with the present invention includes: a plurality of radio communication devices connected to one another via a wireless network, and each provided with a radio control unit for achieving timing synchronization using frames having a fixed period, assigning a transmission and reception interval during which a report signal for informing state management information about each of the above-mentioned radio communication devices and a control signal for controlling each of the above-mentioned radio communication devices are transmitted and received to a fixed time interval at a head of each of the frames, for transmitting and receiving application data to and from a partner radio communication device during another time interval, and for reserving and securing one or more of communication band units, each of which has a fixed width and into which each frame is divided according to a difference between a transmission rate of the above-mentioned application data and that of a signal in a wireless section, on a unit-by-unit basis by using the above-mentioned report signal and the above-mentioned control signal, a transmit side radio communication device determining an available communication band from the state management information about the wireless network and also determining the transmission rate of the wireless section and a required communication band from the transmission rate of the above-mentioned application data while informing a reservation for the above-mentioned determined communication band to a receive side radio communication device by using the above-mentioned control signal, and the receive side radio communication device receiving the above-mentioned reservation informed thereto, and determining whether or not communications can be carried out from both an internal state of the receive side radio communication device itself and the state management information about the above-mentioned wireless network, in which the above-mentioned transmit side radio communication device secures the above-mentioned reserved communication band in response to a response showing that communications can be carried out from the above-mentioned receive side radio communication device.

In accordance with the present invention, there are provided a radio communication device and a radiocommunication system which prevent the occurrence of errors when carrying out radio communications of application data which requires a real-time nature, such as a video image, to reduce the transmission delay, thereby improving the transmission performance.

EMBODIMENTS OF THE INVENTION

Hereafter, in order to explain this invention in greater detail, the preferred embodiments of the present invention will be described with reference to the accompanying drawings. Embodiment 1.

Figure 1:
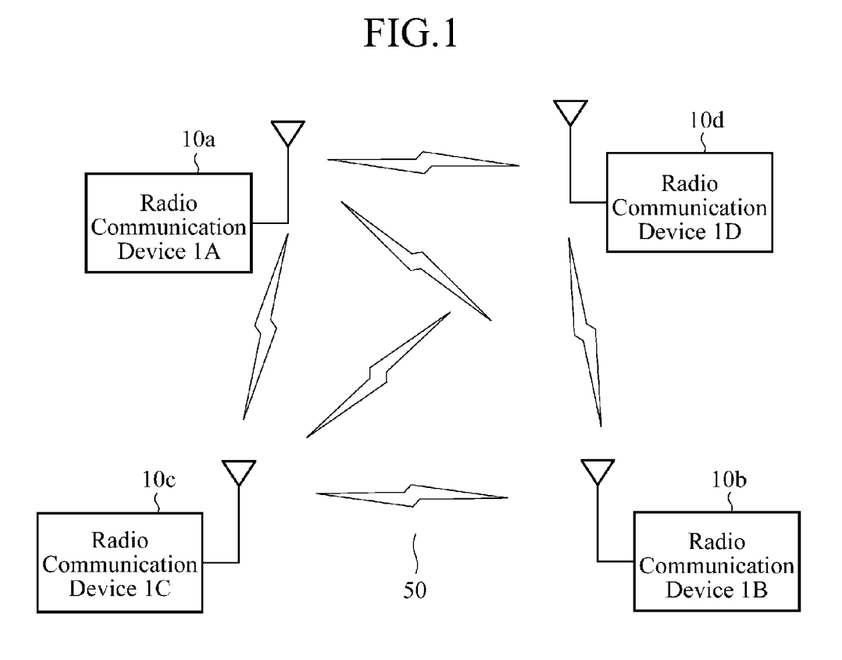
FIG. 1 is a diagram showing an example of the structure of a wireless network constructed of radio communication devices in accordance with Embodiment 1 of the present invention.

FIG. 1 is a view showing the structure of a radio communications system in which a plurality of radio communication devices in accordance with Embodiment 1 of the present invention are connected to one another.

As shown in FIG. 1, each of the radio communication devices 1A to 1D (10a to 10d) in accordance with Embodiment 1 of the present invention is a terminal device which communicates with a partner one of the radio communication devices 1A to 1D (10a to 10d) to transmit and receive a radio signal to and from the partner radio communication device via a wireless network 50 such as a UWB (Ultra Wide Band) network which will be mentioned below.

Figure 2:
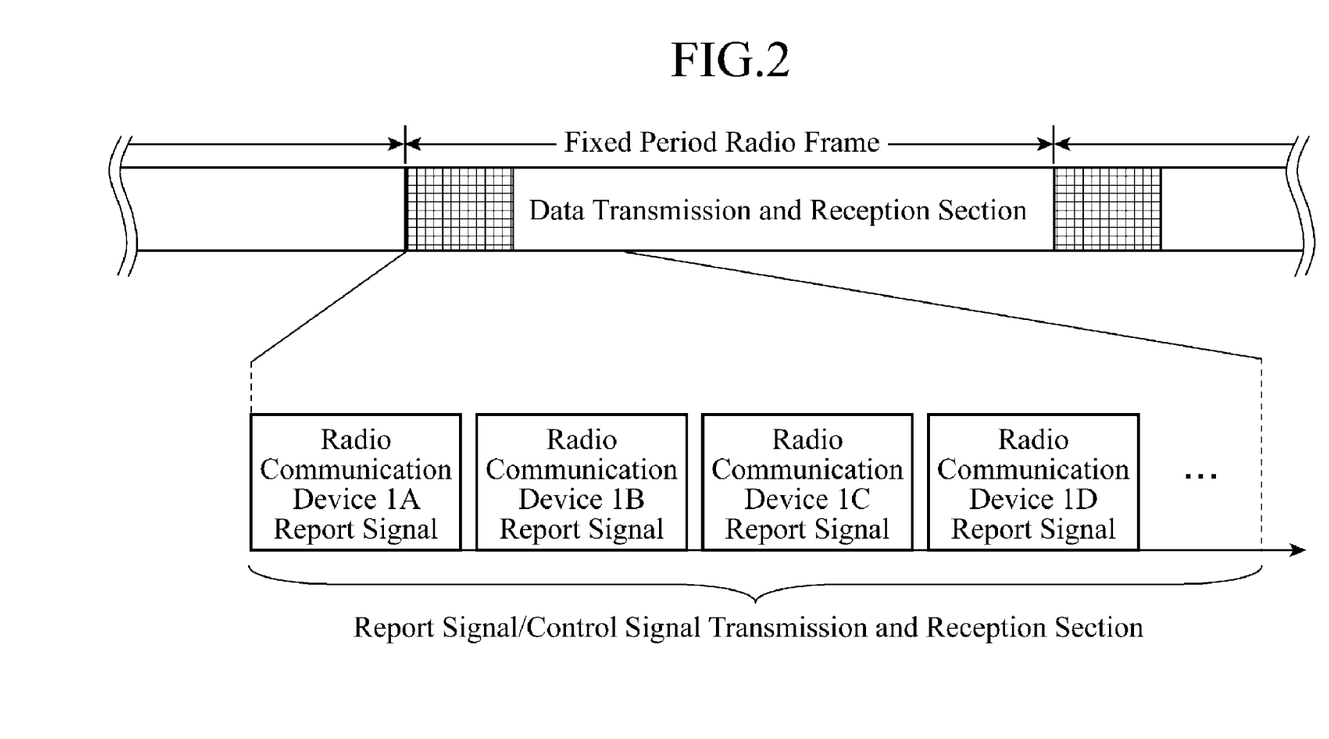
FIG. 2 is a view for explaining radio signal frames which the radio communication device in accordance with Embodiment 1 of the present invention uses.

FIG. 2 is a view showing an example of the data format of each radio signal frame which each radio communication device in accordance with Embodiment 1 of the present invention uses.

As shown in FIG. 2, each of the radio communication devices 1A to 1D (10a to 10d) operates by achieving timing synchronization using frames having a certain constant period. Furthermore, to a fixed time interval at the head of each frame, a report signal/control signal transmission and reception section (interval) during which a report signal for reporting mutual state management information to each of the radio communication devices 1A to 1D (10a to 10d) which construct the wireless network 50, and a control signal for controlling a function which each of the radio communication devices 1A to 1D (10a to 10d) has are transmitted and received, and a data transmission and reception section (interval) during which application data, such as an image signal, are transmitted and received mutually among the radio communication devices 1A to 1D (10a to 10d) are assigned, so that communications between radio communication devices are carried out.

Transmission and reception of the above-mentioned report signal and the above-mentioned control signal are carried out for each frame, and each of the radio communication devices 1A to 1D (10a to 10d) can grasp the state of the wireless network 50 by monitoring the report signal. Therefore, each of the radio communication devices 1A to 1D (10a to 10d) transmits and receives a radio signal according to whether or not there is a necessity to perform a control operation.

During each section during which application data are transmitted and received mutually among the radio communication devices 1A to 1D (10a to 10d), two of the radio communication devices 1A to 1D (10a to 10d) which desire to carry out communications communicate with each other by reserving and securing some of communication band units, each of which has a fixed width and into which each frame is divided, on a unit-by-unit basis by using the report signal and the control signal. It is assumed that in order to reserve and secure some communication band units, DRP (Distributed Reservation Protocol) which is used for a UWB network which complies with an MB-OFDM (Multi Band-Orthogonal Frequency Division Multiplex) method is used, for example.

A radio transmission speed which complies with UWB is of an order ranging from 53.3 to 480 Mbps (Mega bit per sec), including overhead. On the other hand, when MPEG 2-TS (Moving Picture Experts Group 2-Transport Stream) is assumed as an image signal, its transmission rate is of an order of 30 Mbps. In the case of UWB, each of the radio communication devices 1A to 1D (10a to 10d) communicates with a partner radiocommunication device by securing some communication band units for the radio communication device 1A, . . . , or 1D (10a, . . . , or 10d) itself by using a beacon signal according to above-mentioned DRP for each of frames having a period of 65 msec.

The remaining band in which no communication band units are reserved and secured can be used for carrying out communications using a CSMA/CA (Carrier Sense Multiple Access with Collision Avoidance) method as occasion demands.

Figure 3:
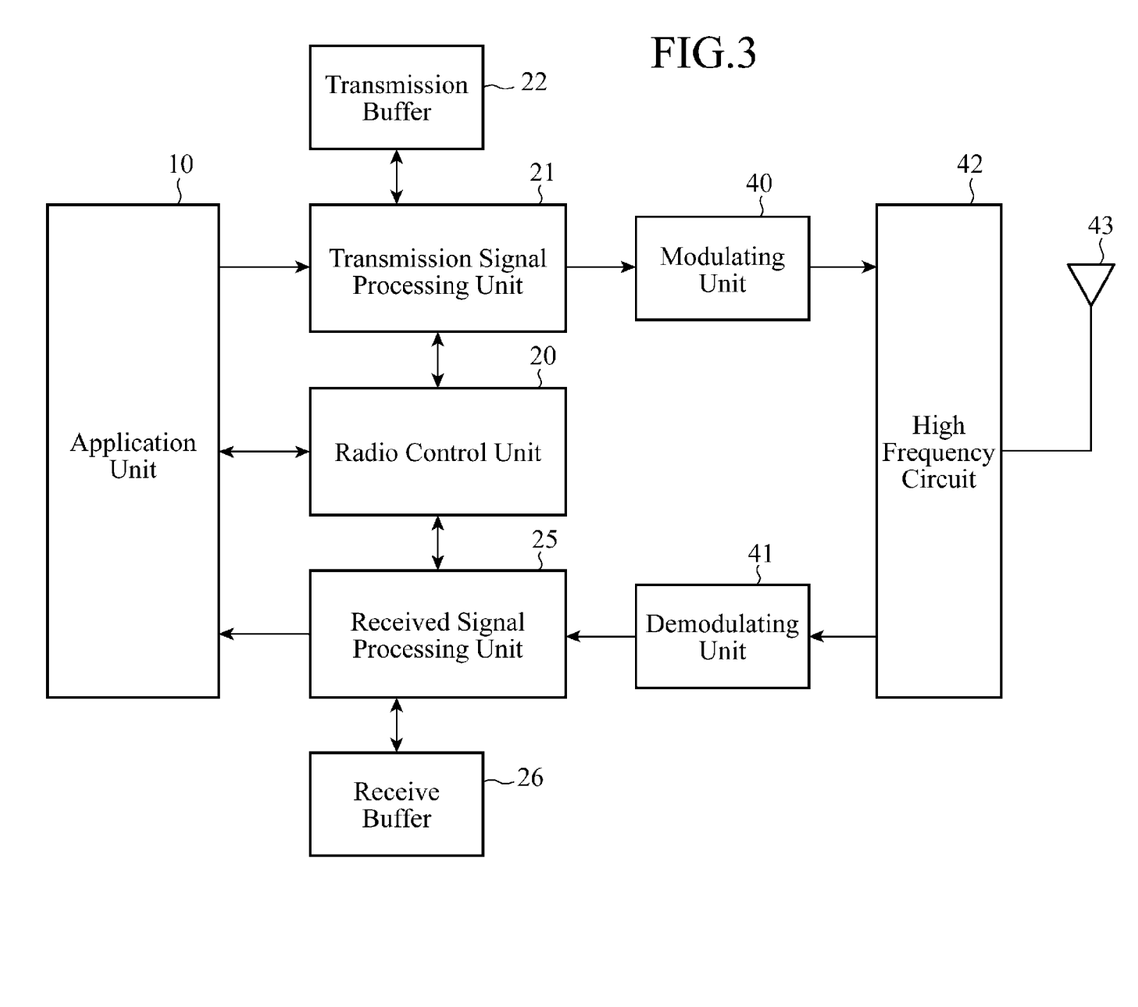
FIG. 3 is a block diagram showing the structure of the radio communication device in accordance with Embodiment 1 of the present invention.

FIG. 3 is a block diagram showing the internal structure of each of the radio communication devices 1A to 1D (10a to 10d) in accordance with Embodiment 1 of the present invention.

As shown in FIG. 3, each of the radio communication devices 1A to 1D (10a to 10d) in accordance with Embodiment 1 of the present invention has an application unit 10, a radio control unit 20, a received signal processing unit 21, a transmission buffer 22, a received signal processing unit 25, a receive buffer 26, a modulating unit 40, a demodulating unit 41, a high frequency circuit 42, and an antenna 43.

The application unit 10 has a function of generating application data, such as a video image to be transmitted, and delivering the application data to the transmission signal processing unit 21. The transmission signal processing unit 21 has a function of converting the application data into packets, and storing these packets in the transmission buffer 22.

The modulating unit 40 has a function of modulating the packets (the application data) stored in the transmission buffer 22 according to a modulation method which complies with a radio method which the radio communication system uses under the control of the transmission signal processing unit 21, and then furnishing the packets modulated thereby to the high frequency circuit 42.

The high frequency circuit 42 has a function of converting the packets modulated by the modulating unit 40 into a signal having a desired radio frequency, and transmitting this signal to the partner one of the radio communication devices 1A to 1D (10a to 10d) with predetermined transmission power by way of the antenna 43. The high frequency circuit 42 also has a function of frequency-converting the received signal received via the antenna 43 to a signal, and inputting this signal to the demodulating unit 41.

The demodulating unit 41 has a function of demodulating the received signal to generate data and then inputting the data to the received signal processing unit 25, and the received signal processing unit 25 has a function of temporarily storing the data which the demodulating unit has generated by demodulating the received signal in the receive buffer 26. The data temporarily stored in the receive buffer 26 are read out under the control of the radio control unit 20, and are delivered to the application unit 10.

The radio control unit 20 has a radio signal transmitting and receiving function of achieving timing synchronization using frames having a fixed period, assigning a transmission and reception interval during which a report signal for informing state management information about each of the radio communication devices 1A to 1D (10a to 10d) and a control signal for controlling each of the radio communication devices 1A to 1D (10a to 10d) are transmitted and received to a fixed time interval at the head of each frame, and transmitting and receiving application data to and from the partner one of the radio communication devices 1A to 1D (10a to 10d) during another time interval, and a communication band management function of reserving and securing some of communication band units, each of which has a fixed width and into which each frame is divided so as to reduce a transmission delay according to the difference between the transmission rate of the application data and that of signals in the wireless section, on a unit-by-unit basis by using the report signal and the control signal. The details of these functions will be mentioned below.

Hereafter, a flow of the transmission of application data by each of the radio communication devices 1A to 1D (10a to 10d) will be explained with reference to FIG. 3.

Hereafter, a case in which application data, such as a video image, are transmitted from a transmit side radio communication device 1A (10a) to a receive side radio communication device 1B (10b), will be explained as an example.

Application data to be transmitted which are generated by the application unit 10 of the transmit side radio communication device 1A (10a) are furnished to the transmission signal processing unit 21, are packetized by this transmission signal processing unit, and are temporarily stored in the transmission buffer 22.

The transmission signal processing unit 21 then reads the application data stored in the transmission buffer 22 at a predetermined timing, and transfers the application data to the modulating unit 40. The modulating unit 40 modulates the packetized application data according to the modulation method which complies with the radio method which the radio communication system uses, and the transmit side radio communication device converts the packetized application data modulated by the modulating unit into a signal having the desired radio frequency by way of the high frequency circuit 42 and the antenna 43, and transmits the signal to the receive side radio communication device 1B (10b) with predetermined transmission power.

In the transmit side radio communication device 1A (10a), because the application data temporarily stored in the transmission buffer 22 are used also as data for retransmission control when an transmission error of the wireless section occurs in the receive side radio communication device 1B (10b), the application data will not be discarded until they are normally transmitted to the transmit side radio communication device 1A (10a).

On the other hand, the receive side radio communication device 1B (10b) performs frequency conversion on the received signal received via the antenna 43 by using the high frequency circuit 42, and inputs the frequency-converted received signal to the demodulating unit 41. The signal inputted to the demodulating unit 41 is demodulated by the demodulating unit 41, is then inputted to the received signal processing unit 25, and is temporarily stored in the receive buffer 26. The data stored in the receive buffer 26 are read out at a predetermined timing by the received signal processing unit 25, and are outputted to the application unit 10.

By the way, the transmission and reception control of the report signal and the control signal is carried out by the radio control unit 20. For example, in the wireless network 50 shown in FIG. 1, the radio communication device 1A (10a) sends its own state management information which the radio communication device has within the radio control unit 20 to the transmission signal processing unit 21, and the transmission signal processing unit 21 performs a control operation of sending out the state management information via a report signal section at the head of a radio frame and transmits the report signal by way of the modulating unit 40, the high frequency circuit 42, and the antenna 43.

At that time, each of the other radio communication devices 1B to 1D (10b to 10d) in the wireless network 50 receives the report signal from the radio communication device 1A (10a) via the antenna 43, transfers the report signal to the received signal processing unit 25 via the high frequency circuit 42 and the demodulating unit 41, and, when the received signal processing unit 25 decodes the received data to know that the data is a report signal, the received signal processing unit transfers the report signal to the radio control unit 20. The radio control unit 20 then notices that the received data is the state management information about the radiocommunication device 1A (10a), and updates the state management information in the wireless network 50.

Figure 4:
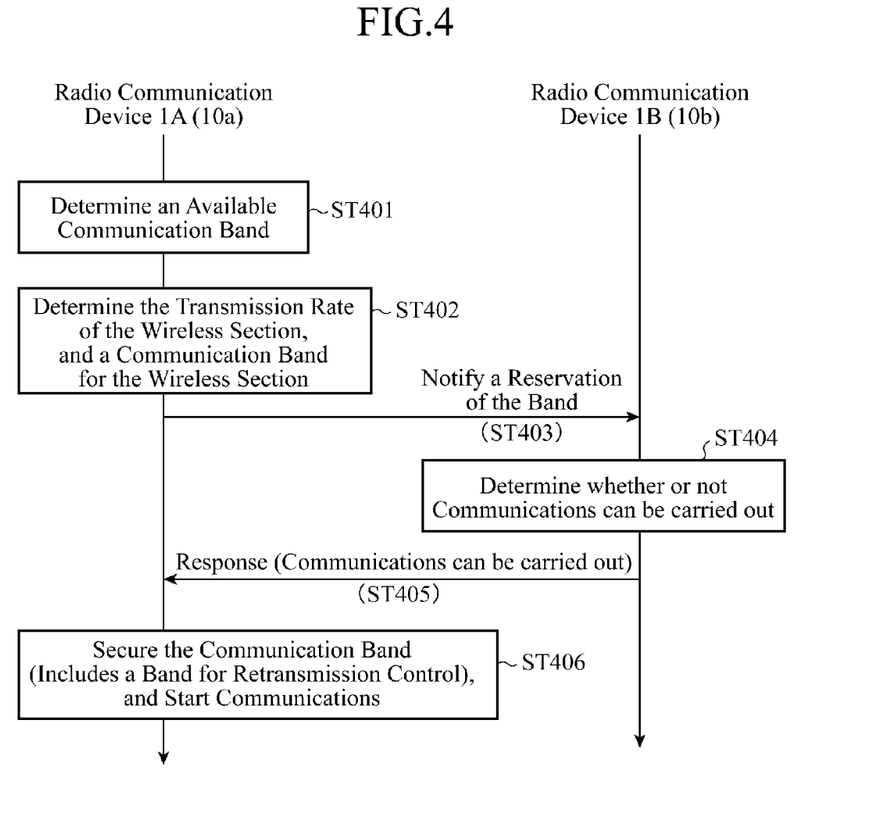
FIG. 4 is a sequence diagram showing an operation of reserving and securing a communication band of the radio communications system in accordance with Embodiment 1 of the present invention.

An operation of the radio communication system in the case of transmitting application data from the radio communication device 1A (10a) to the radio communication device 1B (10b) is shown in a sequence diagram of FIG. 4.

Hereafter, the fundamental operation of the radio communication system in the case of transmitting application data will be explained with reference to the sequence diagram of FIG. 4.

In the radio communication device 1A (10a), the radio control unit 20 determines an available communication band from the state management information in the wireless network 50 first (step ST401), and also determines the transmission rate of the wireless section and a required communication band for the wireless section from the transmission rate of application data informed thereto from the application unit 10 (step ST402).

Next, the radio control unit 20 of the radiocommunication device 1A (10a) informs the determined communication band to the receive side radio communication device 1B (10b) by using a control signal in order to reserve the determined communication band (step ST403).

The radio control unit 20 of the radio communication device 1B (10b) which has received this control signal determines whether or not communications can be carried out from both the internal state of the device itself and the state management information in the wireless network 50 (step ST404), and sends a response showing that communications can be carried out to the radio communication device 1A (10a) when making sure that communications can be carried out (step ST405).

The radio control unit 20 of the radio communication device 1A (10a) which has acquired the response starts carrying out communications by securing the communication band (step ST406). The communication band secured at this time also includes a communication band for retransmission control which will be mentioned below. The details of the communication band for retransmission control will be mentioned below with reference to FIG. 6.

Figure 5:
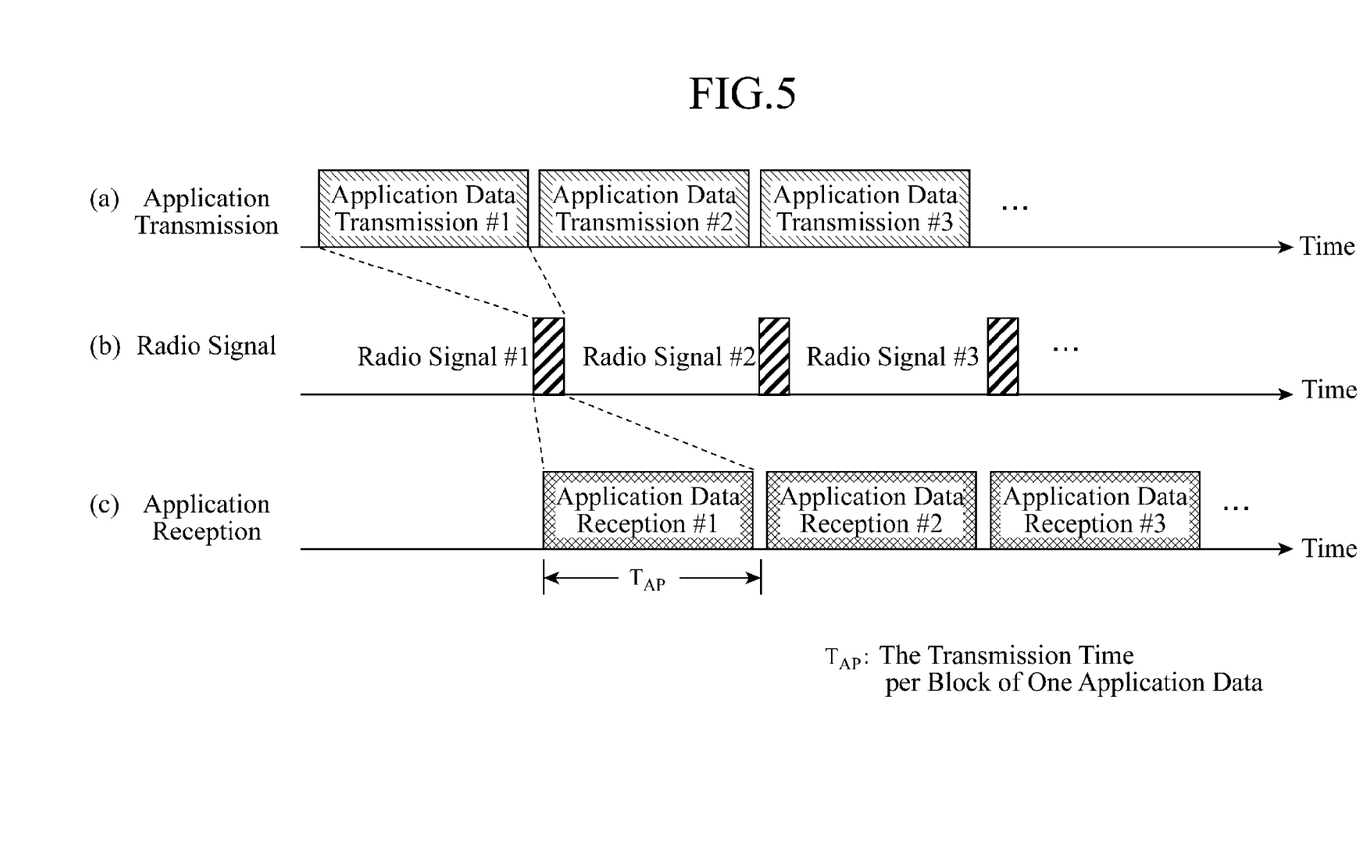
FIG. 5 is a view for explaining the operation of reserving and securing a communication band of the radio communication device in accordance with Embodiment 1 of the present invention.

The process for securing the communication band which is performed in step ST406 needs to be carried out in such a way that no transmission delay occurs due to a transmission fluctuation, for example, as shown in FIG. 5, in consideration of the difference between the transmission rate of the application data and that of the wireless section.

FIG. 5 is a timing chart showing a transmission operation of the transmit side radio communication device (application transmission), a transmission operation of transmitting a radio signal in the wireless section, and a reception operation of the receive side radio communication device (application reception) on the time axis.

As shown in FIG. 5, the radio control unit 20 reduces the transmission delay by reserving and securing the communication band in such a way that the average of the transmission rate of the application data becomes equal to that of the wireless section during each transmission time period TAP per block of the application data, and the transmission time periods are constant.

In accordance with above-mentioned Embodiment 1, when any of the radio communication devices 1A to 1D (10a to 10d) secures a band required for communications, the radio control unit 20 can reduce the transmission fluctuation of the application data transmitted via the wireless section by optimizing the band securing for the wireless section by taking into consideration the signal transmission rate of the upper layer (application) and the radio transmission rate while carrying out the band securing by also taking into consideration the retransmission control based on transmission errors in the wireless section.

At this time, the radio control unit 20 can reduce the transmission delay by reserving and securing the communication band in such a way that the average of the transmission rate of the application data becomes equal to that of the wireless section during each transmission time period (TAP shown in FIG. 5) per block of the application data, and the transmission time periods are constant, thereby being able to improve the transmission performance.

Embodiment 2

Figure 6:
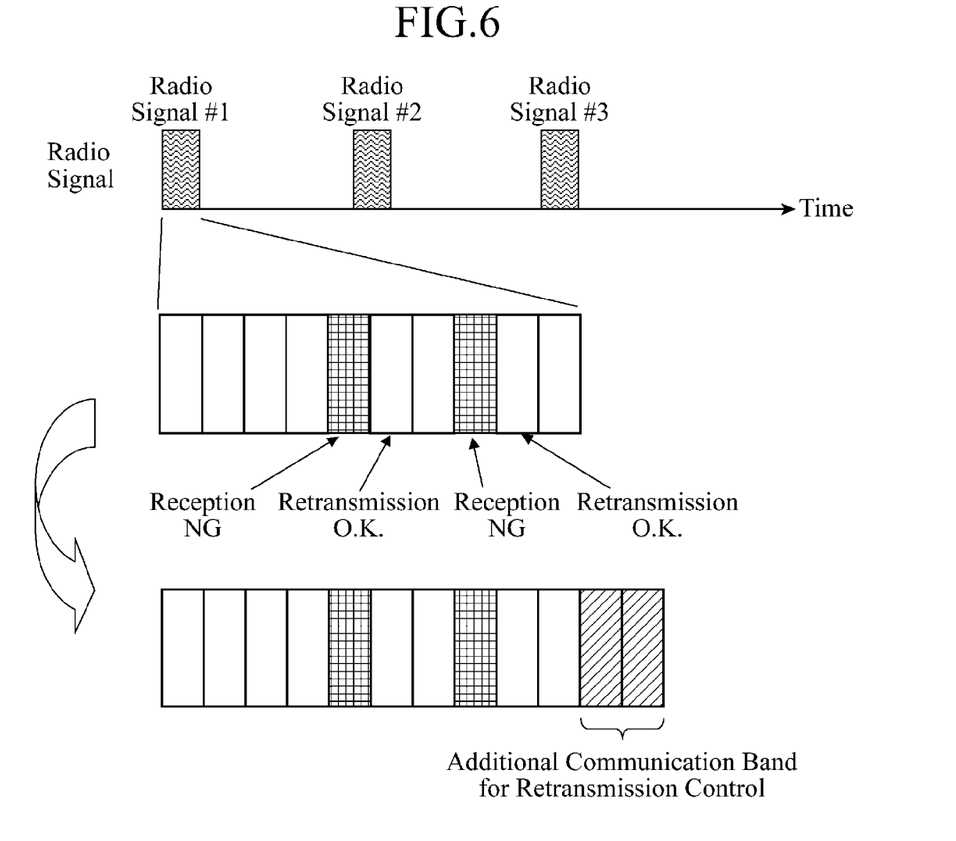
FIG. 6 is a view for explaining an operation of reserving and securing a communication band for retransmission control of a radio communication device in accordance with Embodiment 2 of the present invention.

The radio control unit 20 also needs to further take into consideration transmission errors in the wireless section. FIG. 6 is a view showing radio signals (radio signals #1 to #3) developed on the time axis in order to explain band securing at the time of occurrence of transmission errors in the wireless section.

As shown in FIG. 6, in a case in which the radio control unit 20 can transmit ten packets of application data by using a communication band per block which the radio control unit has secured, when transmission errors for two of the packets occur in the wireless section of the radio signal #1, as shown by receive NG in FIG. 6, the radio control unit needs to transmit the two packets of the application data which are not received by the receive side radio communication device 1B (10b) with a communication band per block (the radio signal #2) which the radio control unit secures the next time, and therefore suspends the transmission of the application data temporarily.

Although the radio control unit 20 can avoid the temporary blackout of the transmission of the application data due to the above-mentioned transmission errors occurring in the wireless section by transferring the received data to the application unit 10 after buffering the received data in advance in the receive buffer 26, the real time nature is lost because a transmission delay corresponding to the buffered amount of data occurs in this case.

To solve this problem, the radio control unit 20 adds a band for retransmission control to the communication band for the packets which the radio control unit has to originally transmit to secure the band for retransmission control to enable the transmission of the ten original packets. The communication band for the two packets which the radio control unit secures in consideration of the additional communication band for retransmission control corresponds to a hatched portion shown in FIG. 6.

The radio control unit 20 adds the band for retransmission control to the communication band for the packets which the radio control unit has to originally transmit according to the transmission quality of the wireless section to estimate, reserve and secure the band for retransmission control, and performs a control operation of sending all the packets that are to be transmitted via the communication band per block.

More specifically, the radio control unit 20 performs a control operation of, when the transmission quality of the wireless section is good, decreasing the band for retransmission control to be added, whereas when the transmission quality is bad, increasing the band for retransmission control to be added so as to prevent transmission errors from occurring in the wireless section in the communication band per block and to eliminate the transmission delay.

To this end, the radio control unit 20 performs the control operation of sending all the packets that are to be transmitted via the communication band per block so as to prevent transmission errors from occurring in the wireless section and to eliminate the transmission delay by monitoring the transmission quality of the wireless section, and adding the band for retransmission control to the communication band for the packets which the radio control unit has to originally transmit by using a received field strength (RSSI: Received Signal Strength Indicator) informed thereto from the demodulating unit 41, for example, to estimate, reserve and secure the band for retransmission control.

In order to implement this control operation, the radio control unit 20 has an estimated value table in which communication bands for retransmission control to be added (the numbers of retransmitted packets) are defined. This estimated value table is allocated and stored to and in a predetermined region of a memory (not shown) which the radio control unit 20 has therein.

In the estimated value table, for each combination of radio communication settings including a radio modulation method, a transmission rate, a transmission data length, and an error correcting code for use in the radio communication devices 1A to 1D (10a to 10d), required communication bands are predefined from the transmission error characteristics of the wireless section with respect to each received field strength of the radio communication devices 1A to 1D (10a to 10d).

Figure 7:
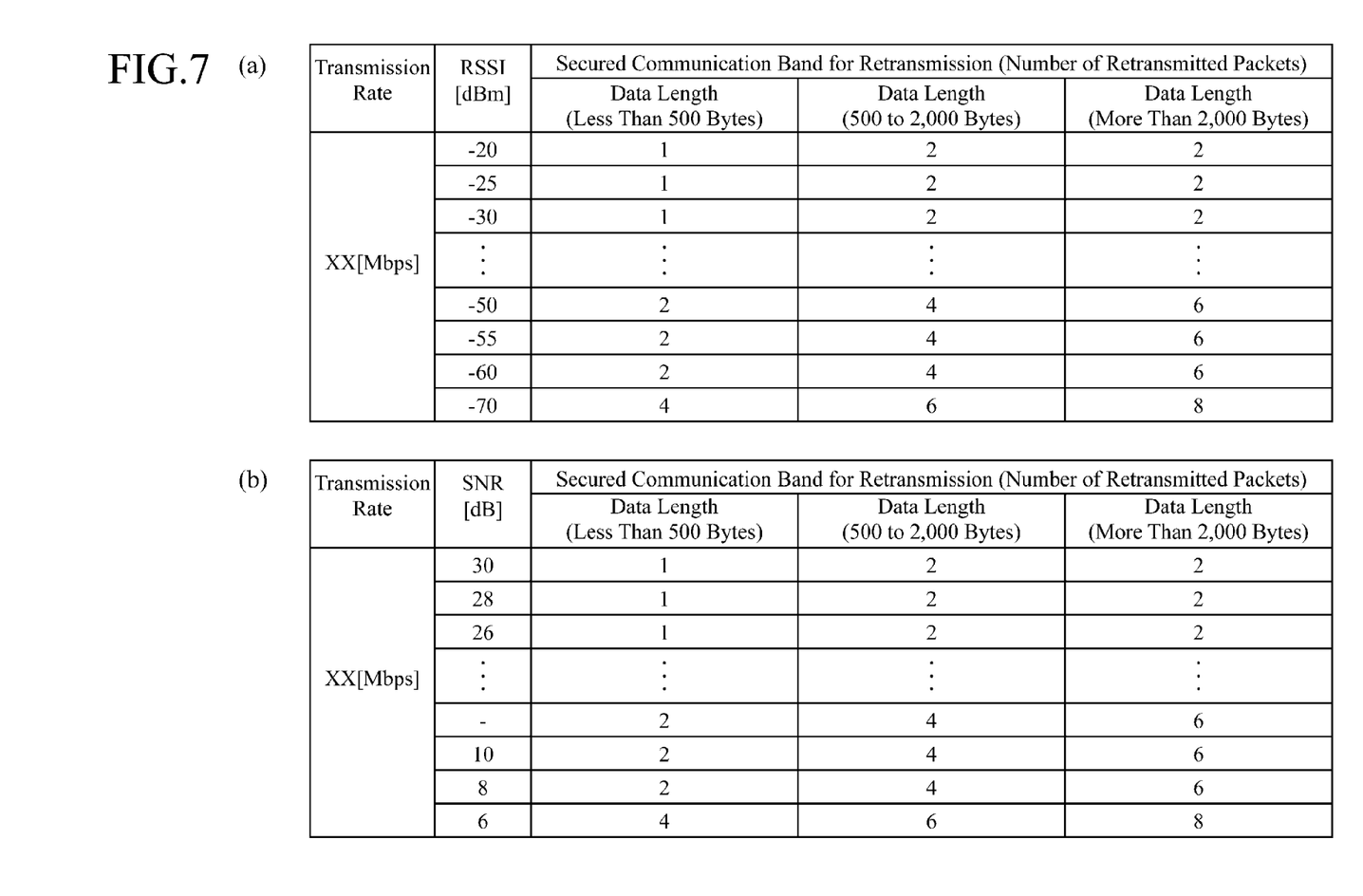
FIG. 7 is a view showing an example of the data structure of an estimated value table for use in the radio communication device in accordance with Embodiment 2 of the present invention.

An example of the data structure of the estimated value table is shown in FIG. 7(a). In each radio method, a radio modulation method and an error correcting code are used fixedly for different transmission rates. Therefore, in this example, the transmission rate (XX [Mbps]) is defined as a parameter, and a communication band secured for retransmission (the number of retransmitted packets) is defined for each of data lengths (less than 500 bytes, 500 to 2,000 bytes, and more than 2,000 bytes) according to the received field strength (RSSI [dBm]).

According to the RSSI informed from the demodulating unit 41, the radio control unit 20 reads the number of retransmitted packets corresponding to the RSSI from the estimated value table stored in the internal memory, and adds the number of retransmitted packets to the communication band for the packets which the radio control unit has to originally transmit to reserve and secure the packet communication band for retransmission control.

It is assumed that even during communications, the radio control unit 20 performs a control operation of dynamically updating the band estimated value for retransmission control according to a level change of the RSSI.

The radio control unit 20 can alternatively add the band for retransmission control to the communication band for the packets which the radio control unit has to originally transmit by using a signal to noise ratio (SNR: Signal Noise Rate) informed from the demodulating unit 41, instead of the above-mentioned RSSI, to estimate, reserve and secure the band for retransmission control.

Also in this case, the radio control unit needs to perform the control operation of sending all the packets that are to be transmitted via the communication band per block so as to prevent transmission errors from occurring in the wireless section and to eliminate the transmission delay.

In this case, as the communication band for retransmission control to be added, required communication bands which are determined for each combination of radio communication settings including a radio modulation method, a transmission rate, a transmission data length, and an error correcting code for use in the radio communication devices 1A to 1D (10a to 10d) from the transmission error characteristics of the wireless section corresponding to each SNR of the above-mentioned radio communication devices are stored in the internal memory of the radio control unit 20 in the form of the estimated value table, like in the case of using the above-mentioned RSSI. According to the SNR informed from the above-mentioned demodulating unit 41, the radio control unit reads the number of retransmitted packets corresponding to the SNR from the estimated value table and performs the control operation.

An example of the data structure of the estimated value table which the radio control unit uses at this time is shown in FIG. 7(b). In each radio method, a radio modulation method and an error correcting code are fixed normally for different transmission rates. Therefore, as shown in FIG. 7(b), the transmission rate (XX [Mbps]) is defined as a parameter, and a communication band secured for retransmission (the number of retransmitted packets) is defined for each of data lengths (less than 500 bytes, 500 to 2,000 bytes, and more than 2,000 bytes) according to the SNR [dB].

According to the SNR informed from the demodulating unit 41, the radio control unit 20 reads the number of retransmitted packets corresponding to the SNR from the estimated value table stored in the internal memory, and adds the number of retransmitted packets to the communication band for the packets which the radio control unit has to originally transmit to reserve and secure the packet communication band for retransmission control.

It is assumed that even during communications, the radio control unit 20 performs a control operation of dynamically updating the band estimated value for retransmission control according to a change of the SNR.

In the radio communication device in accordance with above-mentioned Embodiment 2, the radio control unit 20 can carry out transmission of packets in consideration of transmission errors occurring in the wireless section by adding a communication band for retransmission control to the communication band for the packets which the radio control unit has to originally transmit according to the transmission quality of the wireless section to estimate, reserve and secure the band for retransmission control. More specifically, the radio control unit 20 performs a control operation of, when the transmission quality of the wireless section is good, decreasing the communication band for retransmission control to be added, whereas when the transmission quality is bad, increasing the communication band for retransmission control to be added so as to prevent transmission errors from occurring in the wireless section in the communication band per block and to eliminate the transmission delay.

The radio control unit 20 has the estimated value table in which required communication bands are determined for a radio communication setting consisting of at least one of a radio modulation method, a transmission rate, a transmission data length, and an error correcting code for use in the radio communication devices from the transmission error characteristics of the wireless section with respect to each received field strength or each signal to noise ratio, and determines the communication band for retransmission control to be added by referring to the estimated value table according to the received field strength or signal to noise ratio at the time of reception of application data to reserve and secure the communication band for retransmission control to be added. As a result, each radio communication device and the radio communication system can reduce the transmission delay.

Embodiment 3

Figure 8:
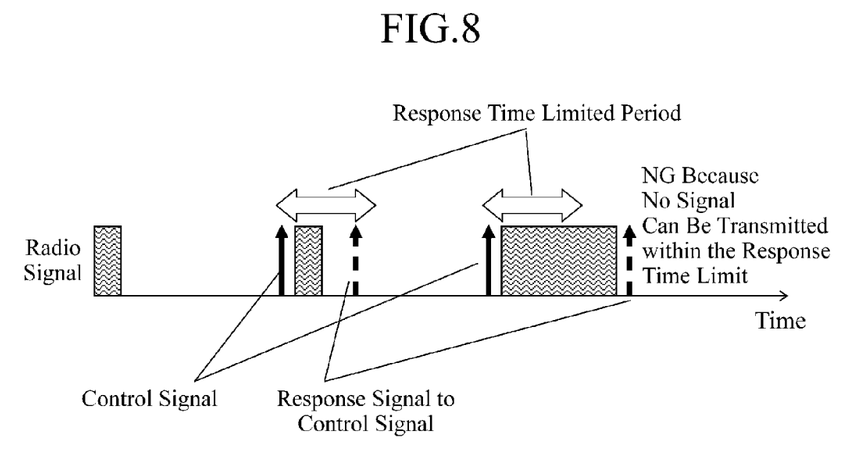
FIG. 8 is a view for explaining an operation of reserving and securing a communication band of a radio communication device in accordance with Embodiment 3 of the present invention.

FIG. 8 is a timing chart showing an operation of each radio communication device in accordance with Embodiment 3 of the present invention, and shows an operation on the time axis in a case in which a control signal having a response time limitation imposed on the application unit 10 is transmitted between a radio communication device 1A (10a) and a radio communication devices 1B (10b) at random.

Also in Embodiment 3 which will be explained hereafter, each radio communication device has the same structure as the radio communication devices 1A to 1D (10a to 10d) shown in FIG. 3, like in the case of Embodiment 1.

In an example of the structure of a wireless network including the radio communication device 1A (10a) and the radio communication device 1B (10b), when a control signal having a response time limitation imposed on the application unit 10 is transmitted between the radio communication device 1A (10a) and the radio communication devices 1B (10b), the radio control unit 20 performs a control operation of not reserving and securing any communication band per block exceeding the response time limit in order to comply with the response time limitation imposed on control signals, as shown in FIG. 8. More specifically, when transmitting a control signal having a response time limit, the radio control unit does not secure any band exceeding the response time limit.

While securing a communication band to transmit application data, such as an image signal, when transmitting application control data (a control signal) having a response time limit, each radio communication device in accordance with above-mentioned Embodiment 3 does not secure any communication band per unit exceeding the response time limit. Therefore, each radio communication device can prevent a situation in which each radio communication device becomes able to send a response within the response time limit, but cannot carry out signal transmission from occurring.

All of the functions which the radio control unit 20 shown in FIG. 3 has can be implemented via software, or at least a part of them can be implemented via hardware.

For example, the radio control unit 20's data process of achieving timing synchronization using frames having a fixed period, assigning a transmission and reception interval during which a report signal for informing state management information about each of the radio communication devices 1A to 1D (10a to 10d) and a control signal for controlling each of the radio communication devices 1A to 1D (10a to 10d) are transmitted and received to a fixed time interval at the head of each frame, and transmitting and receiving application data to and from the partner one of the radio communication devices 1A to 1D (10a to 10d) during another time interval, and the radio control unit 20's data process of reserving and securing some of communication band units, each of which has a fixed width and into which each frame is divided according to the difference between the transmission rate of the application data and that of signals in the wireless section, on a unit-by-unit basis by using the report signal and the control signal can be implemented via one or more programs running on a computer, or at least a part of them can be implemented via hardware.

INDUSTRIAL APPLICABILITY

Because the radio communication device and the radio communication system in accordance with the present invention can provide an improvement in the transmission performance by preventing transmission errors from occurring and reducing the transmission delay, the radio communication device and the radio communication system in accordance with the present invention are suitable for use as a radio communication device and a radio communication system used for communications of application data which require a real time nature, such as video transmission, and so on.

The invention claimed is:

1. A radio communication device utilizing a communication scheme in which data frames having a fixed period are exchanged via a wireless network, the radio communication device comprising:
a radio control unit configured to execute a process including:
achieving timing synchronization using the frames,
assigning a transmission and reception interval during which a report signal for informing state management information about each of radio communication devices and a control signal for controlling each of said radio communication devices are transmitted and received in a fixed time interval at a head of each frame, each frame containing another time interval for transmitting and receiving application data to and from a partner radio communication device, and
reserving and securing communication band units allocated to said another time interval in the frame according to a difference between a transmission rate of said application data and that of a signal in the wireless network, the communication band units being formed by dividing a communication band for said another time interval according to a fixed band width, and being reserved and secured on a unit-by-unit basis by using said report signal and said control signal.

2. The radio communication device according to claim 1, wherein the radio control unit reserves and secures the one or more communication band units in such manner that, during a transmission time interval per each block of said application data to be transmitted to the particular partner radio communication device, an average of the transmission rate of said application data becomes equal to that of the signal in said wireless network.

3. The radio communication device according to claim 1, wherein said radio control unit estimates a transmission error which occurs in said wireless network, adds a communication band for retransmission control which said radio control unit carries out at a time of occurrence of said transmission error to a communication band for the original transmission of the application data to the particular partner radio communication device, and reserves and secures the communication band required for original transmission and retransmission control of the application data.

4. The radio communication device according to claim 3, wherein said radio control unit monitors a received field strength to estimate the transmission error which occurs in said wireless network, and adds the communication band for retransmission control on the basis of the monitored received field strength.

5. The radio communication device according to claim 3, wherein said radio control unit monitors a signal to noise ratio to estimate the transmission error which occurs in said wireless network, and adds the communication band for retransmission control according to the monitored signal to noise ratio.

6. The radio communication device according to claim 4, wherein when estimating the transmission error which occurs in said wireless network, said radio control unit refers to data in which required communication bands are defined according to transmission error characteristics of the wireless network with respect to said received field strength, the data being defined for a radio communication control setting including at least one of a radio modulation method to be used, a transmission rate, a transmission data length, and a used error correcting code.

7. The radio communication device according to claim 5, wherein when estimating the transmission error which occurs in said wireless network, said radio control unit refers to data in which required communication bands are defined according to transmission error characteristics of the wireless network with respect to said signal to noise ratio, the data being defined for a radio communication control setting including at least one of: a radio modulation method to be used, a transmission rate, a transmission data length, and a used error correcting code.

8. The radio communication device according to claim 1, wherein when transmitting application control data having a response time limit between radio communication devices, said radio control unit performs a control operation of not reserving and securing any communication band unit exceeding said response time limit.

9. A radio communications system utilizing a communication scheme in which data frames having a fixed period are exchanged via communication bands, the system comprising:
a receive side radio communication device; and
a transmit side radio communication device for establishing a connection via a wireless network to the receive side radio communication device,
wherein the transmit side radio communication device includes a radio control unit configured to execute a process comprising:
achieving timing synchronization using the frames having a fixed period,
assigning a transmission and reception interval during which a report signal for informing state management information about each of a plurality of radio communication devices and a control signal for controlling said each of the plurality of radio communication devices are transmitted and received to a fixed time interval at a head of each of the frames, each frame containing another time interval for use by the transmit side radio communication device to transmit and receive application data to and from another of the plurality of radio communication devices, and
reserving and securing one or more communication band units of a fixed width for delivering each frame in which application data is transmitted to the receive side radio communication device, according to a difference between a transmission rate of said application data and a signal transmission rate of the wireless network, the one or more communication band units being reserved and secured on a unit-by-unit basis by using said report signal and said control signal, said transmit side radio communication device determining an available communication band from the state management information about said wireless network and also determining the transmission rate of the wireless network and a required communication band from the transmission rate of said application data while informing the receive side radio communication device of a reservation of said determined communication band by using said control signal,
wherein said receive side radio communication device, when informed of said reservation, determines whether or not communications can be carried out from both an internal state of said receive side radio communication device itself and the state management information about said wireless network, wherein said transmit side radio communication device secures said reserved communication band in response to a response showing that communications can be carried out from said receive side radio communication device.

10. A method of radio communication in which data frames having a fixed period are exchanged via a wireless network, the method comprising:

achieving time synchronization using the frames;

assigning a transmission and reception interval during which a report signal for informing state management information about each of a plurality of radio communication devices and a control signal for controlling each of said radio communication devices are transmitted and received in a fixed time interval at a head of each frame, each frame containing another time interval for transmitting and receiving application data to and from a partner radio communication device; and reserving and securing communication band units allocated to said another time interval in the frame according to a difference between a transmission rate of said application data and that of a signal in the wireless network, the communication band units being formed by dividing a communication band for said another time interval into a fixed band width, and being reserved and secured on a unit-by-unit basis by using said report signal and said control signal.

11. The method according to claim 10, wherein the communication band units are reserved and secured in such manner that, during a transmission time interval per each block of said application data to be transmitted to the particular partner radio communication device, an average of the transmission rate of said application data becomes equal to that of the signal in said wireless network.

12. The method according to claim 10, further comprising:

estimating a transmission error which occurs in said wireless network;

adding a communication band for retransmission control which is carried out at a time of occurrence of said transmission error to a communication band for the original transmission of the application data to the particular partner radio communication device; and reserving and securing the communication band required for original transmission and retransmission control of the application data.

13. The method according to claim 12, further comprising monitoring a received field strength to estimate the transmission error which occurs in said wireless network, wherein the communication band for retransmission control is added on the basis of the monitored received field strength.

14. The method according to claim 12, further comprising monitoring a signal to noise ratio to estimate the transmission error which occurs in said wireless network, wherein the communication band for retransmission control is added according to the monitored signal to noise ratio.

15. The method according to claim 13, wherein the transmission error which occurs in said wireless network is estimated by referring to data in which required communication bands are defined according to transmission error characteristics of the wireless network with respect to said received field strength, the data being defined for a radio communication control setting including at least one of a radio modulation method to be used, a transmission rate, a transmission data length, and a used error correcting code.

16. The method according to claim 14, wherein the transmission error which occurs in said wireless network is estimated by referring to data in which required communication bands are defined according to transmission error characteristics of the wireless network with respect to said signal to noise ratio, the data being defined for a radio communication control setting including at least one of: a radio modulation method to be used, a transmission rate, a transmission data length, and a used error correcting code.

17. The method according to claim 10, further comprising performing a control operation when transmitting application control data having a response time limit between radio communication devices, said control operation preventing the reserving and securing of any communication band unit exceeding said response time limit.

* * * * *